United States Patent
Panchaksharaiah et al.

(10) Patent No.: US 10,652,619 B1
(45) Date of Patent: May 12, 2020

(54) SYSTEMS AND METHODS FOR PROVIDING MEDIA ASSET RECOMMENDATIONS

(71) Applicant: Rovi Guides, Inc., San Jose, CA (US)

(72) Inventors: Vishwas Sharadanagar Panchaksharaiah, Tumkur District (IN); Madhusudhan Seetharam, Karnataka (IN); Prateek Varshney, Karnataka (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 16/364,599

(22) Filed: Mar. 26, 2019

(51) Int. Cl.
| | |
|---|---|
| *H04N 21/475* | (2011.01) |
| *H04N 21/422* | (2011.01) |
| *H04N 21/442* | (2011.01) |
| *H04N 21/466* | (2011.01) |

(52) U.S. Cl.
CPC ... *H04N 21/4756* (2013.01); *H04N 21/42203* (2013.01); *H04N 21/44204* (2013.01); *H04N 21/4668* (2013.01)

(58) Field of Classification Search
CPC ......... H04N 21/4756; H04N 21/42203; H04N 21/44204; H04N 21/4668
USPC .......................................................... 725/46
See application file for complete search history.

(56) References Cited

U.S. PATENT DOCUMENTS

| | | | |
|---|---|---|---|
| 9,852,214 B2 | 12/2017 | Fife | |
| 10,360,280 B2 * | 7/2019 | Catalano | G06F 16/958 |
| 2008/0086742 A1 * | 4/2008 | Aldrey | H04H 60/33 |
| | | | 725/24 |
| 2009/0030792 A1 * | 1/2009 | Khivesara | G06Q 30/0253 |
| | | | 705/14.51 |
| 2013/0275519 A1 * | 10/2013 | Nichols | G06Q 10/107 |
| | | | 709/206 |
| 2014/0282709 A1 * | 9/2014 | Hardy | H04N 21/44222 |
| | | | 725/34 |
| 2016/0034970 A1 * | 2/2016 | Musil | G06F 16/435 |
| | | | 705/14.66 |
| 2016/0366485 A1 * | 12/2016 | Nishimura | H04N 21/4821 |
| 2017/0366861 A1 * | 12/2017 | Chung | H04N 21/431 |
| 2018/0184157 A1 * | 6/2018 | Newell | H04N 21/442 |
| 2018/0232372 A1 * | 8/2018 | Venkataraman | G06F 16/48 |
| 2019/0261044 A1 * | 8/2019 | Avedissian | G06F 3/0481 |

OTHER PUBLICATIONS

U.S. Appl. No. 09/332,244, filed Jun. 11, 1999, Ellis.

* cited by examiner

*Primary Examiner* — Nathan J Flynn
*Assistant Examiner* — Caroline Somera
(74) *Attorney, Agent, or Firm* — Haley Guiliano LLP (57) ABSTRACT

Methods and systems for providing media asset recommendations are described. An input to a user interface requesting content associated with a media asset is detected without corresponding display of the media asset on a display device associated with the user interface. In response, a user interaction history comprising interaction data associated with the media asset is retrieved. The interaction data is analyzed to identify an indecision pattern. In response to detecting the indecision pattern, a plurality of people are identified based on a match between the media asset and media profile information of the people. An electronic query is transmitted to each of the people requesting a recommendation for the media asset. The received responses are generated for display for the user.

20 Claims, 8 Drawing Sheets

SYSTEMS AND METHODS FOR PROVIDING MEDIA ASSET RECOMMENDATIONS

BACKGROUND

This disclosure is generally directed to providing recommendations for a media asset. In particular, methods and systems are provided for providing media asset recommendations to a user in response to detecting indecision with respect to the media asset.

SUMMARY

Media content choices for users, such as movies, music, television programs, and videos are always increasing— especially with the increased access to Internet-enabled interactive devices. These interactive devices include, for example, mobile devices, tablets, computers, smart television systems, and the like. Users are often overwhelmed with the number of media content choices available for viewing at any given time. When selecting a media asset for consuming, users typically seek out additional content associated with the media asset, such as ratings information, to decide whether to consume the media asset. Some media asset recommendation systems rely on user consumption profiles to provide media asset recommendations to the user. However, the user may not find such recommendations credible. Therefore, users, when selecting media assets for viewing, often rely on recommendations from friends and family members whom they find more credible.

Given the large number of media asset choices available for viewing, it is not practical for a user to collect recommendations from other people for every available media asset. Instead, users may want recommendations for media assets that they are undecided about. Moreover, users may not have a practical way to obtain recommendations from other people at the time they are considering watching the media asset.

Accordingly, to overcome these problems, systems and methods are provided herein for providing recommendations to a user for a media asset that the user is undecided on. In particular, systems and methods described herein provide control circuitry that provides media asset recommendations to users from other people in response to detecting that the user is undecided about watching the media asset.

The system monitors a user's interactions with a user interface to detect an input requesting content associated with a media asset. In particular, the system monitors the inputs to the user interface to detect an input while the media asset is not displayed on a display device associated with user interface. For example, the system may detect such an input when the user requests ratings information for the movie "Wonder Woman." In response to the user requesting content associated with the movie "Wonder Woman," the system determines whether the user has previously referenced the movie. If so, the system retrieves the record of previous user interactions associated with the media asset (e.g., previous requests for ratings information for the movie "Wonder Woman").

The system, upon retrieving the user interaction history, detects a pattern indicative of indecision (i.e., an indecision pattern) by the user with respect to the media asset based on the user interaction history. In some embodiments, the system detects the indecision pattern by determining a number of times the user has previously requested content associated with media asset without displaying the media asset. For example, the system may analyze the retrieved user interaction history to determine a number of times the user has previously requested ratings information for the movie "Wonder Woman." The system may detect the indecision pattern when the number of times the user has previously requested content associated with the media asset without displaying the media asset exceeds a threshold. For example, the system may detect the indecision pattern when the it determines that the user has previously requested content (e.g., ratings information) associated with the movie "Wonder Woman" at least three times.

In some embodiments, the system detects the indecision pattern by determining whether a portion of the media asset was previously generated for display. In particular, the system determines a duration for which the media asset was generated for display on a display device associated with the user. For example, the system may analyze the retrieved user interaction history to determine the duration for which the movie "Wonder Woman" was generated for display on a display device associated with the user. The system may detect the indecision pattern based on the retrieved user interaction history when the duration for which the media asset was generated for display does not exceed a threshold. For example, the system may detect the indecision pattern when the movie "Wonder Woman" was previously generated for display for less 10 minutes (i.e., the user watched a few minutes of the movie but did not complete watching it).

Once the system detects the indecision pattern, the system selects recipients of electronic queries based on a match between the media asset and media profile information of the recipients. In some embodiments, the system retrieves media asset viewing histories of a plurality of people associated with the user. For example, the system may retrieve the media asset viewing histories of the user's friends and family members. The system then determines, based on the retrieved media asset viewing histories, whether the media asset was previously viewed by one or more of the plurality of people. For example, the system determines whether anyone in the user's social circles has previously viewed the movie "Wonder Woman." In response, the system selects the people who have previously viewed the media asset as recipients for queries asking for their recommendations.

The system transmits the electronic queries to the recipients and waits for the responses. For example, the recipients may receive the query on one or more electronic devices such as a mobile device associated with each of the recipients. The responses to the queries are relayed back to the user and generated for display by one or more interactive devices associated with the user. For example, a digital assistant belonging to the user may announce the responses received from other people providing their recommendations for the movie "Wonder Woman." In an embodiment, the system may summarize the received responses to the electronic queries by assigning a respective weight to the received responses based on a similarity between the media asset viewing history of the user and the viewing history of each of the recipients.

In this way, the system provides media asset recommendations to a user undecided about watching a media asset. Moreover, by detecting that the user is undecided about viewing a particular media asset based on the prior interaction history with content associated with the media asset, the system ensures that the media asset is of interest to the user. This ensures that the people within the user's social circle aren't overwhelmed by requests for recommendations for every media asset.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Methods and systems in accordance with the present disclosure are described herein for providing media asset recommendations to a user. A user, while browsing through available media assets, may request content associated with a media asset (e.g., ratings information) to make a decision about whether to watch the media asset. The system, in response to detecting that the user is undecided about whether to watch the media asset, identifies one or more people associated with the user who have watched the media asset. The system may generate electronic queries seeking the recommendations of people determined to have watched the media asset. The system may then send the queries to electronic devices associated with each of the people determined to have watched the media asset and relay their responses back to the user.

Figure 1:
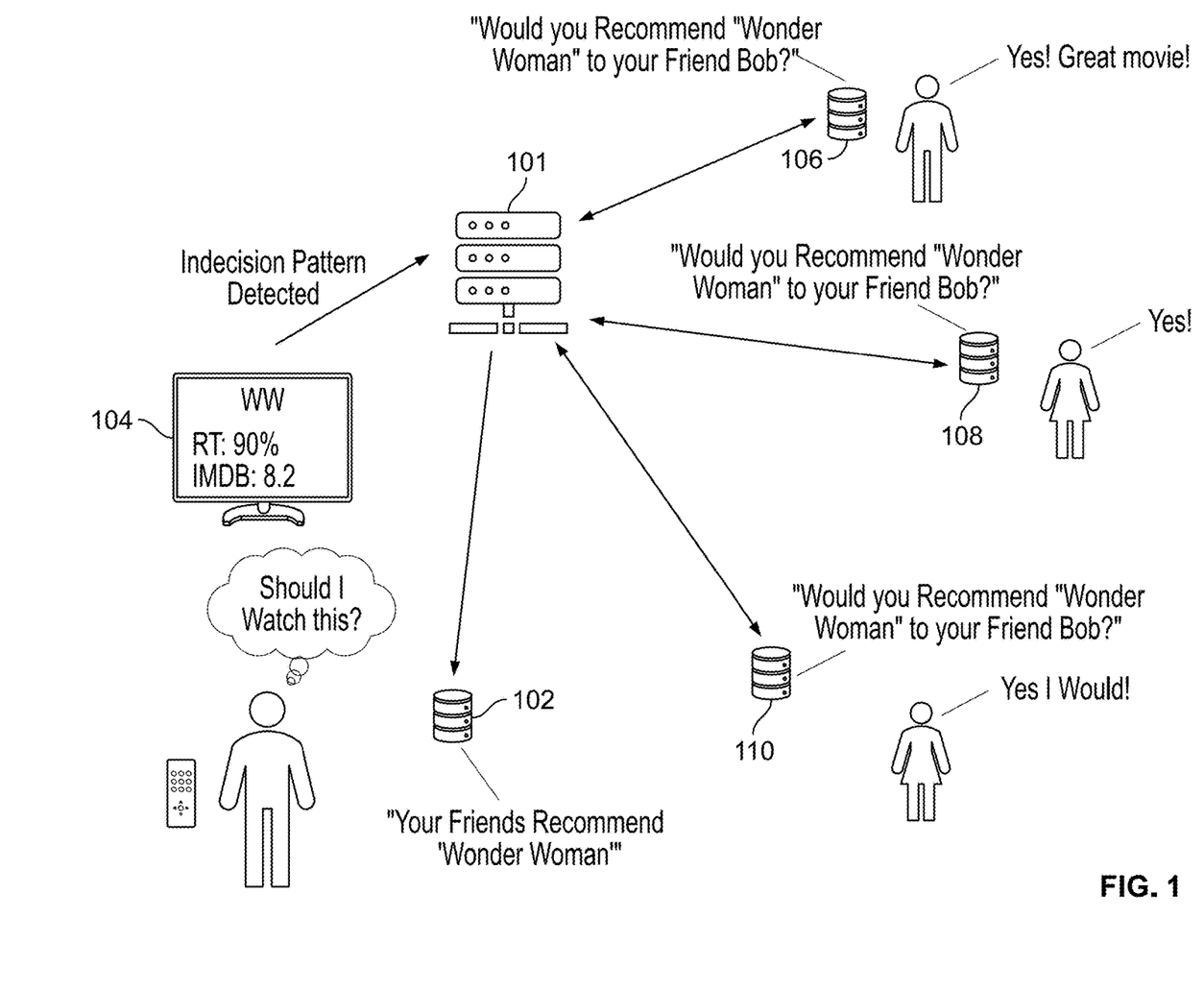
FIG. 1 shows an illustrative system for providing media asset recommendations, in accordance with some embodiments of the disclosure.

FIG. 1 shows an illustrative depiction of a system 100 for providing media asset recommendations to a user in accordance with an embodiment of the present disclosure. System 100 includes a server device 101, first user equipment device 102 (e.g., a first digital assistant associated with a first user), a display 104 (e.g., a television screen associated with the first user), second user equipment device 106 (e.g., a second digital assistant associated with a second user), third user equipment device 108 (e.g., a third digital assistant associated with a third user), and fourth user equipment device 110 (e.g., a fourth digital assistant associated with a fourth user). Although FIG. 1 depicts first, second, third, and fourth user equipment devices 102, 106, 108, and 110 as digital assistants, and display 104 as a television screen, it will be understood that any suitable device for displaying and distributing content may be used, such as user television equipment 302, user computer equipment device 304, and/or wireless user communications device 306, discussed below in relation to FIG. 3. User equipment devices 102-110 may have control circuitry (e.g., control circuitry 204 discussed later in more detail with reference to FIG. 2) configured to process a received query and generate for display the responses to the received query (e.g., on a display such as display 212 or via speakers 214 discussed later in more detail with reference to FIG. 2).

As shown in FIG. 1, a user, while browsing media assets for viewing, may request content associated with a media asset to help them decide whether to watch the media asset. For example, the user may request ratings information associated with the movie "Wonder Woman" to be displayed on a display 104. The system implemented via control circuitry on a server 101, in response to detecting the request for content associated with the media asset, retrieves previous user interactions which reference the movie "Wonder Woman." For example, the server 101 identifies previous instances where the user has either requested ratings information for the movie "Wonder Woman" or watched preview trailers of the movie.

The server 101 analyzes the retrieved user interaction history to determine whether the user interaction history indicates an indecision pattern. For example, the server 101 may detect the indecision pattern when the user has previously requested content associated with the media asset (e.g., ratings information from additional sources) a threshold number of times. In some embodiments, the server 101 may detect the indecision pattern when the user has previously watched at least a portion of the media asset (e.g., watched a first episode of a media asset series comprising multiple episodes). Additional details regarding how to detect the indecision pattern are discussed below in greater detail in connection with FIGS. 6 and 7.

In response to detecting the indecision pattern, the system identifies one or more people within the user's social circle who have previously watched the media asset. For example, the server 101 may request viewing histories of the people associated with the digital assistants 106, 108, and 110 to determine whether they have watched the media asset. In some embodiments, the server 101 may analyze one or more social media posts made by people associated with the user to identify people whose media profile information indicates that they have watched the movie "Wonder Woman." Server 101, based on a match between the media profile of the people associated with the user and the media asset, determines to transmit an electronic query to each of the identified people.

Once the system identifies the people determined to have watched the media asset, server 101 and/or first user equipment device 102 may transmit the query to one or more user equipment devices (e.g., second, third, and fourth user equipment devices 106, 108, and 110) associated with each of the identified people. In some embodiments, server 101 and/or first user equipment device 102 may determine the delivery method for transmitting the query to the people determined to have watched the movie. For example, first user equipment device 102 may determine that the second user is at home and transmit the query via a digital assistant in an audible form. Similarly, when first user equipment device 102 determines that the third user is in her office, the query may be presented in textual form.

First user equipment device 102 receives a response to the transmitted query from each of second user equipment device 106, third user equipment device 108, and fourth user equipment device 110. In the example shown in FIG. 1, the second user may respond by saying "Yes! Great movie!," the third person may respond by saying "Yes!" and the fourth person may respond by saying "Yes I would!". As shown in FIG. 1, the responses to the transmitted query are sent to first user equipment device 102 via server device 101. In some embodiments, the server device 101 may be omitted and the response from the fourth and fifth user equipment devices 108, 110 may be directly communicated to first user equipment device 102.

First user equipment device 102, upon receiving the responses to the transmitted queries, generates for display each received response from the people determined to have watched the movie. In various embodiments, first user equipment device 102 may display each received response in audible form via, for example, speakers 214 (discussed below) or display the received responses on a display screen (e.g., on television screen 104 or a display 212 discussed below).

In some embodiments, first user equipment device 102 may display a summary of the received responses instead of displaying each of them. For example, first user equipment device 102 may assign a respective weight to the responses provided by each of the recipients based on a match between a media profile information of the user and the media profile information of the respective recipient. In such an example, the system gives preferences to recommendations from friends and family members whose media consumption history is more similar to that of the users. First user equipment device 102 then generates a summary of the received responses based on the assigned weights and displays the summary as the recommendation for the media asset based on the received responses. The user is therefore able to receive, in a timely manner, recommendations for media assets from people they know to have watched the movie.

Figure 2:
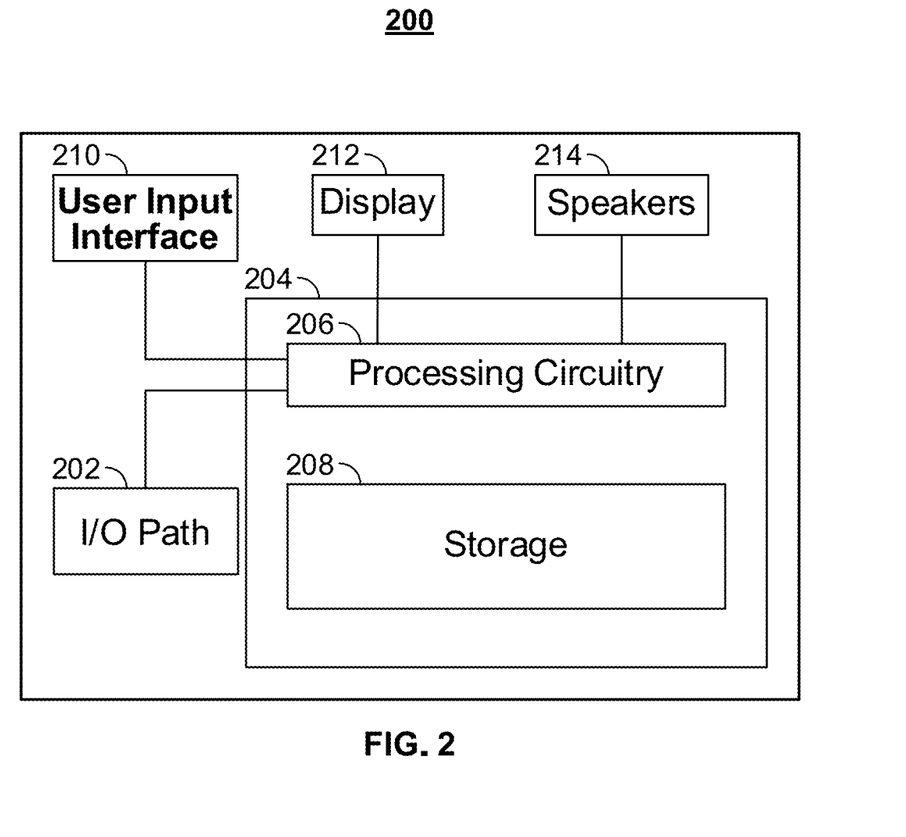
FIG. 2 shows an illustrative block diagram of a system for providing media asset recommendations, in accordance with some embodiments of the disclosure.

FIG. 2 depicts a generalized embodiment of an illustrative device (e.g., user equipment devices 102, 104, 106) that provides media asset recommendations. User equipment device 200 may be any of a plurality of user devices such as a smartphone, a tablet, personal computer, set-top box, etc. (discussed further below with respect to FIG. 3). User equipment device 200 may receive data via input/output (hereinafter "I/O") path 202. I/O path 202 may provide data to control circuitry 204, which includes processing circuitry 206 and storage 208. Control circuitry 204 may be used to send and receive commands, requests, and other suitable data using I/O path 202. I/O path 202 may connect control circuitry 204 (and specifically processing circuitry 206) to one or more communications paths (described below in relation to FIG. 3). I/O functions may be provided by one or more of these communications paths but are shown as a single path in FIG. 2 to avoid overcomplicating the drawing.

Control circuitry 204 may be based on any suitable processing circuitry such as processing circuitry 206. Processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., quad-core). In some embodiments, processing circuitry may be distributed across multiple separate processor or processing units, for example, multiple of the same type of processing units (e.g., two Intel Core i7 processors) or multiple different processors (e.g., Ryzen processor with integrated CPU and GPU processing cores) or may include a multi-core processor (e.g., dual-core, quad-core, hexa-core, or any suitable number of cores) or supercomputer. In some embodiments, control circuitry 204 executes instructions for an application stored in memory (e.g., memory 208). Specifically, control circuitry 204 may be instructed by a media application to perform the functions discussed above and below. In some implementations, any action performed by control circuitry 204 may be based on instructions received from the media application.

Control circuitry 204 may include tuning circuitry, such as one or more analog tuners, one or more MP3 decoders or other digital decoding circuitry, or any other suitable tuning or audio circuits or combinations of such circuits. Encoding circuitry (e.g., for converting analog or digital signals to signals for storage in storage 208) may also be provided. Control circuitry 204 may also include scaler circuitry for upconverting and downconverting content into the preferred output format of user equipment device 200, and converter circuitry for converting between digital and analog signals. The tuning and encoding circuitry may be used by user equipment device 200 to receive, play, and buffer content. The circuitry described herein, including for example, the tuning, audio generating, encoding, decoding, encrypting, decrypting, scaler, and analog/digital circuitry, may be implemented using software running on one or more general purpose or specialized processors. If storage 208 is provided as a separate device from user equipment device 200, the tuning and encoding circuitry may be associated with storage 208.

Storage 208 may be any device for storing electronic data, such as random-access memory, solid state devices, quantum storage devices, hard disk drives, non-volatile memory or any other suitable fixed or removable storage devices, and/or any combination of the same. Control circuitry 204 may allocate portions of storage 208 for various purposes such as caching application instructions, recording media assets, storing portions of a media asset, buffering segments of media, etc. As described herein, storage 208 may be used to store one or more LUTs storing a number of MAC addresses associated with a plurality of user equipment devices and their corresponding profile information.

A user may send instructions to control circuitry 204 using user input interface 210. User input interface 210 may be any suitable user input interface, such as a remote control, mouse, trackball, keypad, keyboard, touch screen, touchpad, stylus input, joystick, voice recognition interface, or other user input interfaces. Instructions to control circuitry 204 may be transmitted through I/O path 202, that could consist of a video tracking and detection mechanism, Internet of Things (IoT) and home automation triggers, emergency alert systems, and software or hardware communication pipelines and/or notification centers.

Display 212 may be provided as a stand-alone device or integrated with other elements of each one of user equipment device 200. For example, display 212 may be a touchscreen or touch-sensitive display, a projector, or a casting device. In such circumstances, user input interface 210 may be integrated with or combined with display 212. Display 212 may be one or more of a monitor, a television, a liquid-crystal display (LCD) for a mobile device, silicon display, e-ink display, light-emitting diode (LED) display, or any other suitable equipment for displaying visual images. Graphics processing circuitry may generate the output to the display 212. In some embodiments, the graphics processing circuitry may be external to processing circuitry 206 (e.g., as a graphics processing card that communicates with processing circuitry 206 via I/O path 202) or may be internal to processing circuitry 206 or control circuitry 204 (e.g., on a same silicone die as control circuitry 204 or processing circuitry 206). In some embodiments, the graphics processing circuitry may be used to receive, display, and play content.

Speakers 214 may be provided as integrated with other elements of user equipment device 200 or may be stand-alone units. The audio component of videos and other content displayed on display 212 may be played through speakers 214. In some embodiments, the audio may be distributed to a receiver (not shown), which processes and outputs the audio via speakers 214. The speakers 214 may be part of, but not limited to, a home automation system.

The media application may be implemented using any suitable architecture. For example, it may be a stand-alone application wholly implemented on user equipment device 200. The user interface application and/or any instructions for performing any of the embodiments discussed herein may be encoded on computer-readable media. Computer-readable media includes any media capable of storing data.

Figure 3:
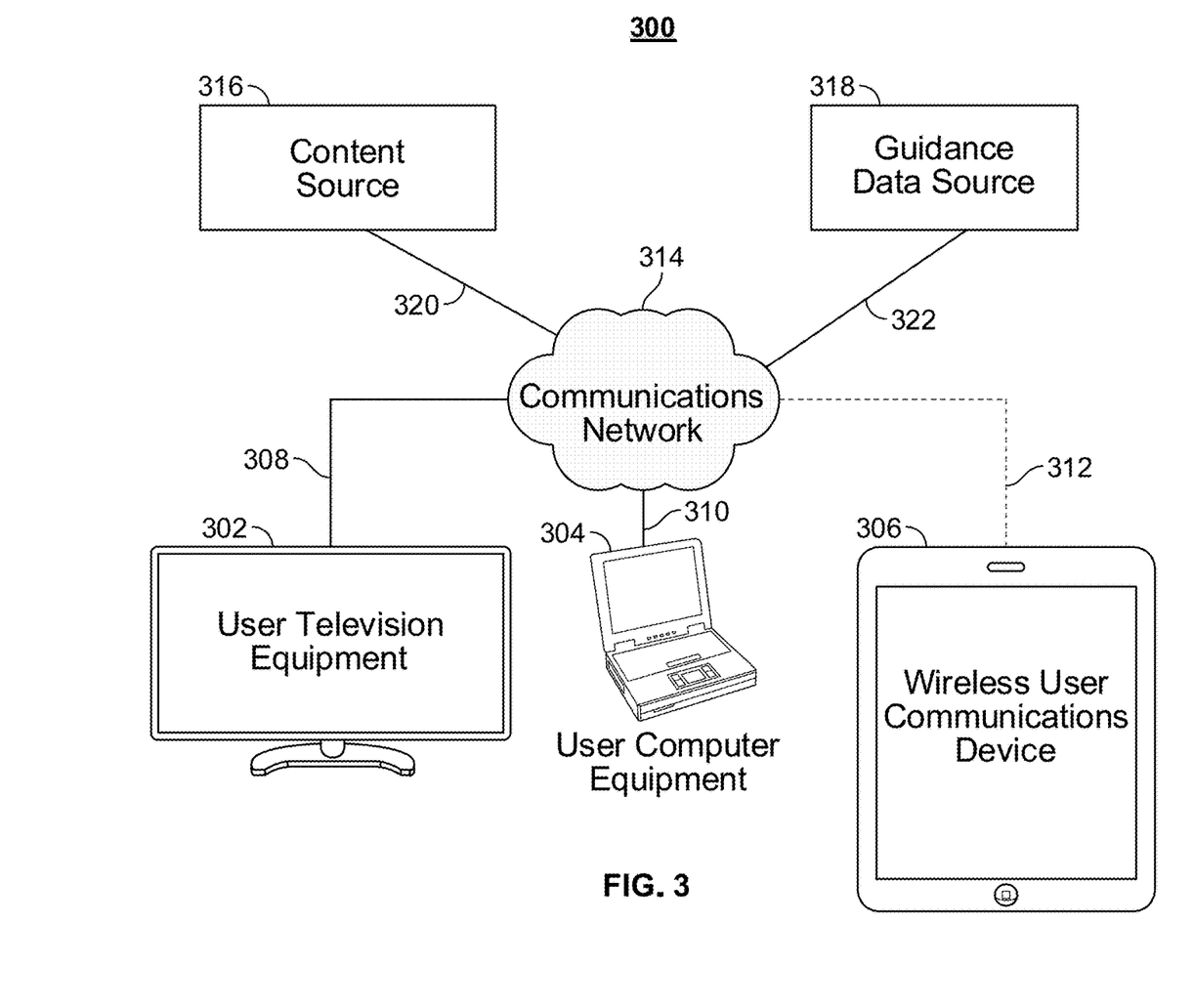
FIG. 3 shows an illustrative block diagram showing additional details of the system of FIG. 2, in accordance with some embodiments of the disclosure.

FIG. 3 depicts an exemplary media system in accordance with some embodiments of the disclosure in which user equipment devices 102, 104, 106, and user equipment device 200 can be implemented in system 300 of FIG. 3 as user television equipment 302, user computer equipment 304, wireless user communications device 306, or any other type of user equipment suitable for accessing media. For simplicity, these devices may be referred to herein collectively as user equipment. User equipment, on which the media application is implemented, may function as a stand-alone device or may be part of a network of devices. Various network configurations of devices may be implemented and are discussed in more detail below.

User television equipment 302 may include a set-top box, an integrated receiver decoder (IRD) for handling satellite television, a television set, a digital storage device, or other user television equipment. One or more of these devices may be integrated to be a single device, if desired. User computer equipment 304 may include a PC, a laptop, a streaming content aggregator, a PC media center, or other user computer equipment. It may include devices like digital assistance, smart speakers, and/or home automation. Wireless user communications device 306 may include a smartphone, a portable video player, a portable music player, a portable gaming machine, a tablet, a wireless streaming device or other wireless device. It should be noted that the lines are blurred when trying to classify a device as one of the above devices and one device may be categorized into one or more of the categories listed above.

In system 300, there is typically more than one of each type of user equipment but only one of each is shown in FIG. 3 to avoid overcomplicating the drawing. In addition, each user may utilize more than one type of user equipment (e.g., a user may have a computer and a tablet) and also more than one of each type of user equipment device (e.g., a user may have multiple television sets).

The user equipment may be coupled to communications network 314. Namely, user television equipment 302, user computer equipment 304, and wireless user communications device 306 are coupled to communications network 314 via communications paths 308, 310, and 312, respectively. Communications network 314 may be one or more networks including the Internet, a mobile phone network, ad-hoc network, cable network, or other types of communications network or combination of communications networks. Paths 308, 310, and 312 may separately or together include one or more communications paths, including any suitable wired or wireless communications path or combination of such paths. Path 312 is drawn with dotted lines to indicate that in the exemplary embodiment shown in FIG. 3 it is a wireless path and paths 308 and 310 are drawn as solid lines to indicate they are wired paths (although these paths may be wireless paths). Communications with the user equipment may be provided by one or more of these communications paths but are shown as a single path in FIG. 3 to avoid overcomplicating the drawing. The user equipment devices may communicate with each other directly through an indirect path via communications network 314 or through a direct path using a device-to-device network (e.g., wired connection such as an Ethernet connection).

System 300 includes content source 316 and guidance data source 318 coupled to communications network 314 via communications paths 320 and 322, respectively. Paths 320 and 322 may include any of the communications paths described above in connection with paths 308, 310, and 312. Communications with the content source 316 and guidance data source 318 may be exchanged over one or more communications paths but are shown as a single path in FIG. 3 to avoid overcomplicating the drawing. In addition, there may be more than one of each of content source 316 and guidance data source 318, but only one of each is shown in FIG. 3 to avoid overcomplicating the drawing. In some embodiments, content source 316 and guidance data source 318 are integrated as one source device. Although communications between sources 316 and 318 with user equipment 302, 304, and 306 are shown as through communications network 314, in some embodiments, sources 316 and 318 may communicate directly with user equipment devices 302, 304, and 306 via communications paths (not shown) such as those described above in connection with paths 308, 310, and 312.

Content source 316 may include one or more types of media distribution equipment such as a media server, cable system headend, satellite distribution facility, intermediate distribution facilities and/or servers, Internet providers, on-demand media servers, and other media providers. Content source 316 may be the originator of media content or may not be the originator of media content. Content source 316 may also include a remote media server used to store different types of media content (including a media asset selected by a user), in a location remote from any of the user equipment. Systems and methods for providing remotely stored media to user equipment are discussed in greater detail in connection with Ellis et al., U.S. patent application Ser. No. 09/332,244, filed Jun. 11, 1999, which is hereby incorporated by reference herein in its entirety.

Guidance data source 318 may provide media guidance data, such as data related to a media asset or profile of a user. Guidance data may be provided to the user equipment using any suitable approach such as via a data feed or by querying a database of guidance data source 318. For example, control circuitry 204 may transmit a query to a database of guidance data source 318 comprising a command to retrieve metadata and an identifier uniquely representing a media asset. In response to transmitting the query, control circuitry 204 may receive a response from the database comprising metadata for the media asset uniquely represented by the identifier.

System 300 is intended to illustrate a number of approaches, or network configurations, by which user equipment devices and sources of media content and guidance data may communicate with each other for the purpose of accessing media and data related to the media. The configuration of the devices and paths in system 300 may change without departing from the scope of the present disclosure.

Figure 4:
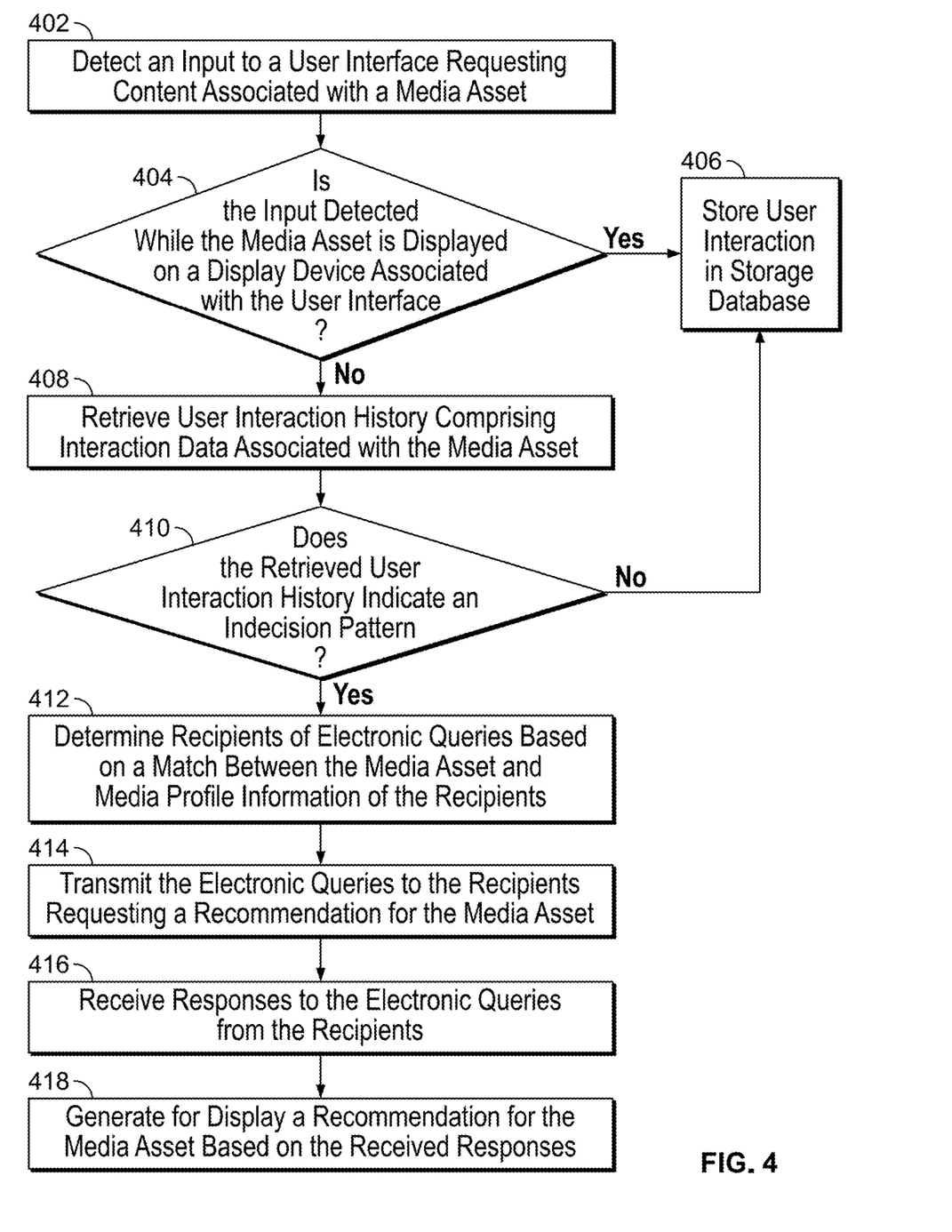
FIG. 4 depicts an illustrative flowchart of a process for providing media asset recommendations, in accordance with some embodiments of the disclosure.

Having described system 300, reference is now made to FIG. 4, which depicts an illustrative flowchart of a process 400 for providing media asset recommendations to users, in accordance with an embodiment. In various embodiments, individual steps of process 400 may be implemented by one or more components of system 200. Although the present disclosure may describe certain steps of process 400 (and of other processes described herein) as being implemented by certain components of system 200, this is for purposes of illustration only, and it should be understood that other components of system 200 may implement those steps instead. For example, steps of process 400 may be executed by server device 101 and/or by user equipment devices 102, 104, 106, 108, or 110 for providing media asset recommendations to a user in response to detecting that the user is undecided about watching the media asset.

As described above, control circuitry 204 of server 101 and/or first user equipment device 102 monitors interactions of the user with the system in which the user requests content associated with a media asset. In some embodiments, the detected input may be a voice input received by the digital assistant 102. Additional details regarding how a voice input is processed by server 101 and/or first user equipment device 102 are described in more detail below in connection with FIG. 5.

At 404, control circuitry 204 of server 101 and/or first user equipment device 102 determines whether the input is detected while the media asset is displayed on a display device associated with the user. For example, the system determines whether the detected input is a request to view the movie "Wonder Woman" on the television screen 104. If so (Yes at 404), process 400 proceeds to 406 and the system stores a user interaction in connection with the media asset in a storage database. The storage database storing the user interactions may be maintained at server 101 and/or first user equipment device 102.

If, at 404, the system determines that the detected input is a request for content associated with the media asset without displaying the movie "Wonder Woman" on the television screen 104 (No at 404), process 400 proceeds to 408. At 408, control circuitry 204 of server 101 and/or first user equipment device 102 retrieves user interaction history comprising interaction data associated with the media asset. For example, control circuitry 204 retrieves previous instances of the user requesting content associated with the movie "Wonder Woman" from the storage database.

At 410, control circuitry 204 analyzes the interaction data associated with the media asset to determine whether the retrieved user interaction history indicates an indecision pattern history. For example, the system may detect the indecision pattern when the user has previously requested content associated with the media asset (e.g., ratings information from additional sources) a threshold number of times. In some embodiments, the server 101 may detect the indecision pattern when the user has previously watched at least a portion of the media asset (e.g., watched a first episode of a media asset series comprising multiple episodes). Additional details regarding how to detect the indecision pattern are discussed below in greater detail in the context of FIGS. 6 and 7.

If, at 410, an indecision pattern is not detected (No at 410), process 400 proceeds to 406 and the system stores the user interaction in connection with the media asset in the storage database. If, on the other hand, an indecision pattern is detected (Yes at 410), process 400 proceeds to 412. At 412, control circuitry 204 determines recipients of electronic queries based on a match between the media asset and media profile information of the recipients. For example, control circuitry 204 may retrieve viewing histories of the people associated with the digital assistants 106, 108, and 110 to determine whether they have watched the movie "Wonder Woman." In some embodiments, control circuitry 204 may analyze one or more social media posts made by people associated with the user to identify people whose media profile information indicates that they have watched the movie "Wonder Woman." Control circuitry 204, based on a match between the media profiles of the people associated with the user and the media asset, determines the recipients for electronic queries requesting a recommendation for the media asset.

Next, at 414, control circuitry 204 of server 101 and/or first user equipment device 102 transmits the queries to the determined recipients requesting a recommendation for the media asset. For example, control circuitry 204 transmits the electronic query to second, third, and fourth user equipment devices 106, 108, and 110 that are associated with the second, third, and fourth users, respectively. In such an example, control circuitry 204 of first user equipment device 102 may tailor the delivery method for transmitting the query based on the user equipment device associated with each of the people determined to have watched the media asset. For example, in the example system 100, control circuitry 204 of server 101 and/or first user equipment device 102 may determine that the second user is at home and transmit the query via a digital assistant in an audible form. Similarly, when first user equipment device 102 determines that the third user is in her office, the query may be presented in textual form.

At 418, control circuitry 204 of first user equipment device 102 generates for display the received responses from user equipment devices associated with the people who responded to the transmitted query. For example, control circuitry 204 of first user equipment device 102 may present the received responses to the user asking the question in audible form via speakers (e.g., speakers 214) of the first user equipment device 102 (e.g., a digital assistant). Alternatively, or in addition to displaying the received responses in audible form, control circuitry 204 of first user equipment device 102 may also display the received responses on one or more display screens (e.g., television screen 104 or display 212) associated with the user seeking the recommendation. In some embodiments, control circuitry 204 of first user equipment device 102 may collect the received responses and summarize them prior to generating for display to the undecided user. An example of a display screen showing received recommendations from other people is described below in more detail in the context of FIG. 8. In such a manner, the process 400 may provide media asset recommendations to a user who is undecided about watching the media asset.

Figure 5:
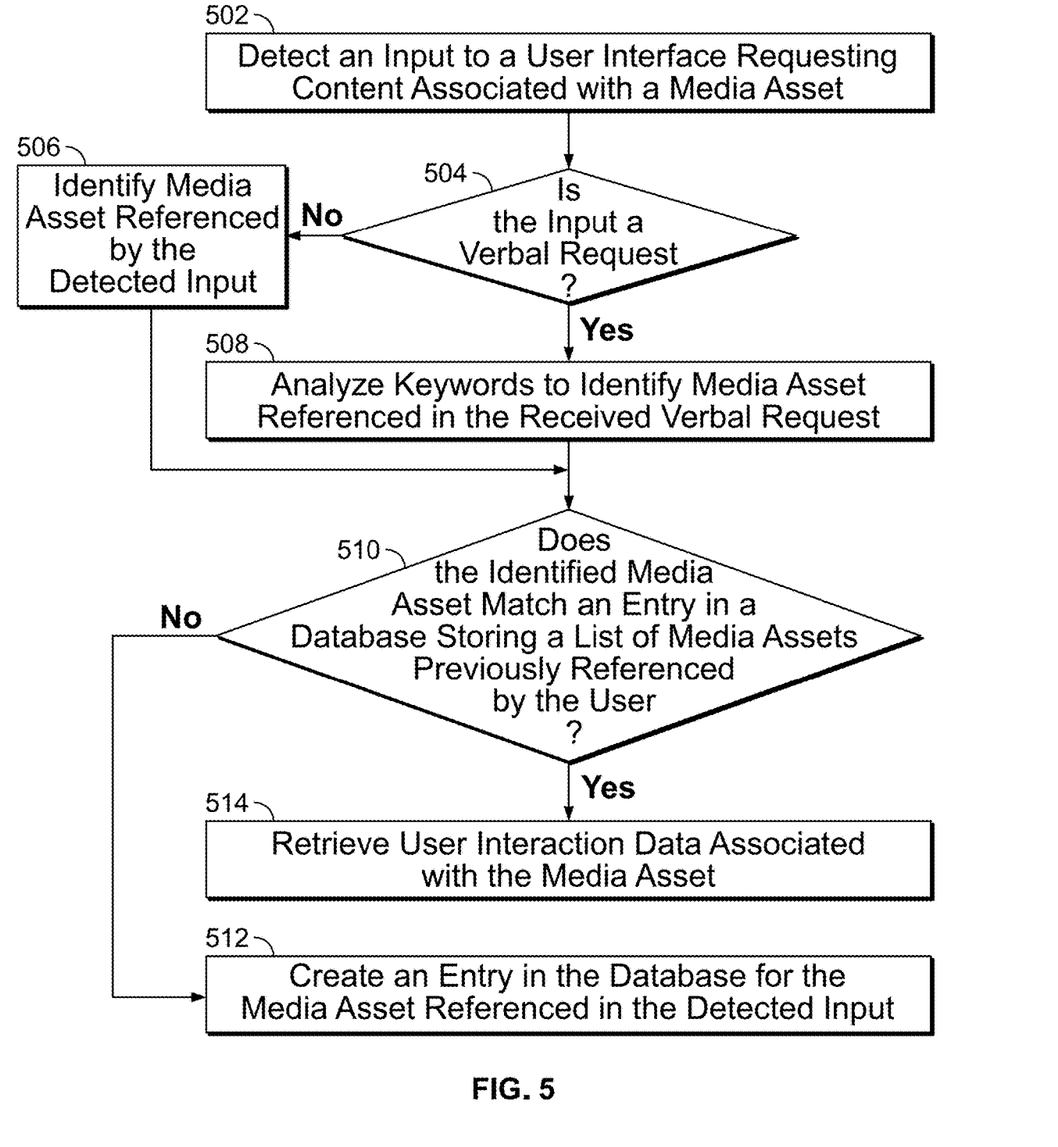
FIG. 5 depicts an illustrative flowchart of a process for retrieving user interaction data associated with a media asset, in accordance with some embodiments of the disclosure.

FIG. 5 depicts an illustrative flowchart of process steps 402, 404, and 408 (see FIG. 4) for recommending media assets, in accordance with some embodiments of the disclosure. At 502, control circuitry 204 of server 101 and/or first user equipment device 102 detects an input to a user interface requesting content associated with a media asset. At 504, control circuitry 204 of server 101 and/or first user equipment device 102 determines whether the detected input is a voice input. For example, the detected input may be a voice request received by a digital assistant (e.g., first user equipment device 102) from a user asking, "Should I watch 'Wonder Woman'?" If the detected input is not a verbal request (NO at 504), the process proceeds to step 506, where control circuitry 204 of server 101 and/or first user equipment device 102 identifies a media asset referenced by the detected input. For example, when the detected input is a selection of a preview trailer, control circuitry 204 of server 101 and/or first user equipment device 102 determines that the movie of which the preview was selected is the media asset referenced by the detected input. If, on the other hand, the detected input is determined to be a verbal request, the process proceeds to 508, where control circuitry 204 identifies keywords included within the received verbal request. For example, when the detected input is a voice request asking, "Should I watch 'Wonder Woman'?" control circuitry 204 identifies the keywords "watch" and "Wonder Woman" from the received input. Control circuitry 204 of server 101 and/or first user equipment device 102 identifies the media asset reference in the received verbal request based on the identified keywords.

At 510, control circuitry 204 of server 101 and/or first user equipment device 102 determines whether the identified media asset matches an entry in a database storing a list of media assets previously referenced by the user. As discussed above, the system maintains a database storing a list of media assets for which the user has previously requested associated content. For example, each time the user watches a preview for a movie or requests ratings information for a movie, an entry is created in the database indicating the request for content associated with the media asset without displaying the media asset. If it is determined that the identified media asset matches an entry in a database storing a list of media assets previously referenced by the user (YES at 510), the process proceeds to 514, where the prior interaction history associated with the media asset is retrieved. If, on the other hand, it is determined that the identified media asset does not match an entry in the database storing a list of media assets previously referenced by the user (NO at 510), the process moves to 512 and a new entry is created in the database for the media asset referenced by the detected input.

Figure 6:
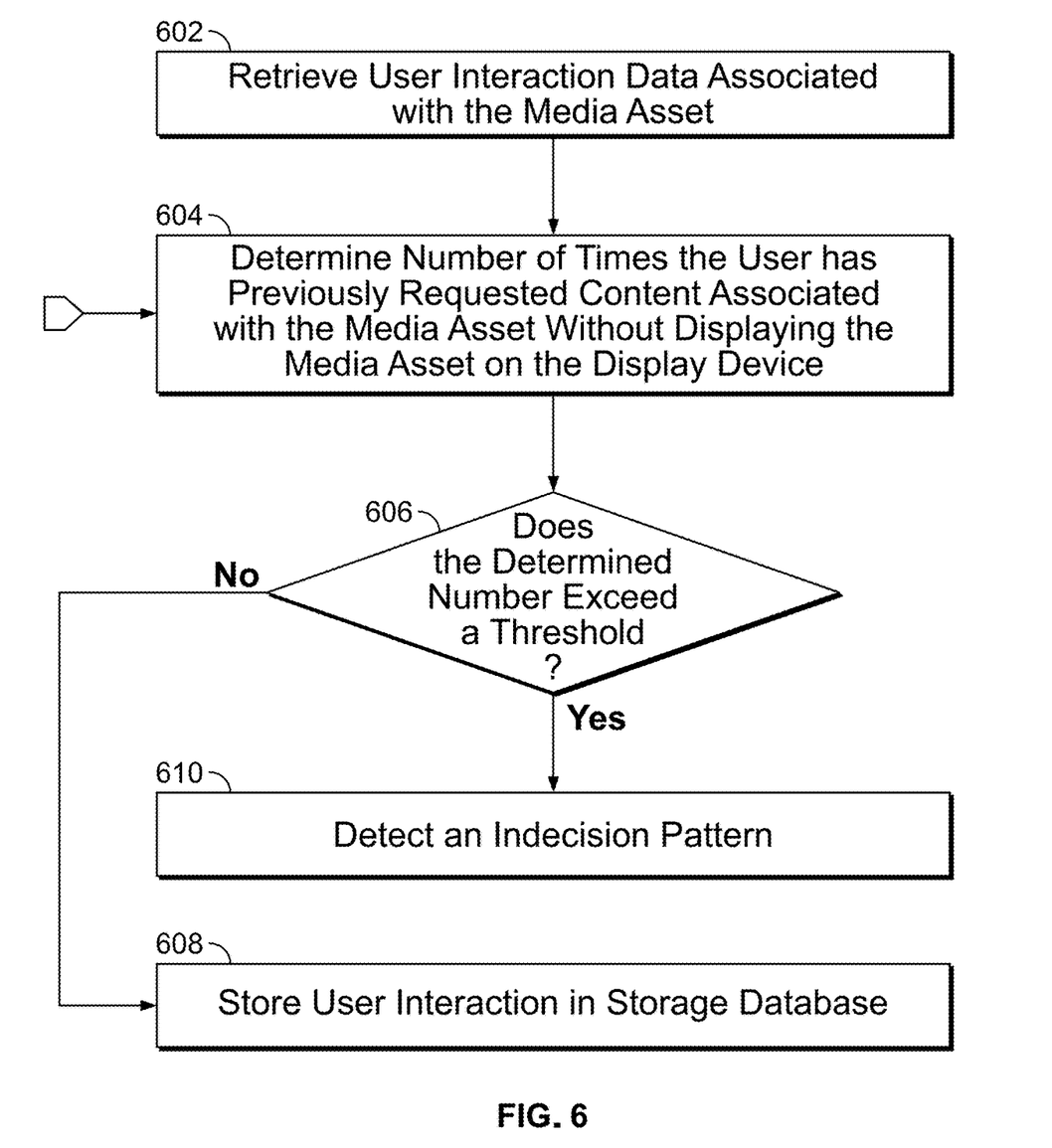
FIG. 6 depicts an illustrative flowchart of a process for detecting an indecision pattern, in accordance with some embodiments of the disclosure.

FIG. 6 depicts an illustrative flowchart of process step 410 (see FIG. 4) for recommending media assets, in accordance with some embodiments of the disclosure. At 602, control circuitry 204 of server 101 and/or first user equipment device 102 retrieves user interaction data associated with the media asset. For example, control circuitry 204 retrieves all previous instances of the user watching a preview of or requesting ratings information for the movie "Wonder Woman." In some embodiments, the system may also retrieve interactions of the user on social media sites that reference the movie "Wonder Woman" (e.g., user reading any articles, posts by other users on social media platforms, etc.).

At 604, control circuitry 204 of server 101 and/or first user equipment device 102 determines the number of times the user has previously requested content associated with the media asset without displaying the media asset on a display device associated with the user. For example, the system counts the number of interactions the user has had that are associated with the movie "Wonder Woman." At 606, the system determines whether the number of interactions exceeds a threshold number of interactions. The threshold number may be a design choice that is predefined. In some embodiments, the threshold number may be adjusted based on user behavior. The system may be trained to analyze how likely the user is to watch a particular media asset relative to a number of interactions associated with the media asset before watching the media asset. For example, the threshold number may be set to a higher number (e.g., 10) for a user who typically consumes a lot of content associated with a media asset before watching the media asset, whereas the threshold number may be a set to a lower number (e.g., 3) for another user who rarely consumes content associated with the media asset before watching the media asset. If it is determined that the number of interactions exceeds the threshold (YES at 606), the process proceeds to 610 where an indecision pattern is detected. If, on the other hand, it is determined that the number of interactions does not exceed the threshold (NO at 606), the process proceeds to 608 and the detected input is stored with the user interaction history associated with the media asset.

Figure 7:
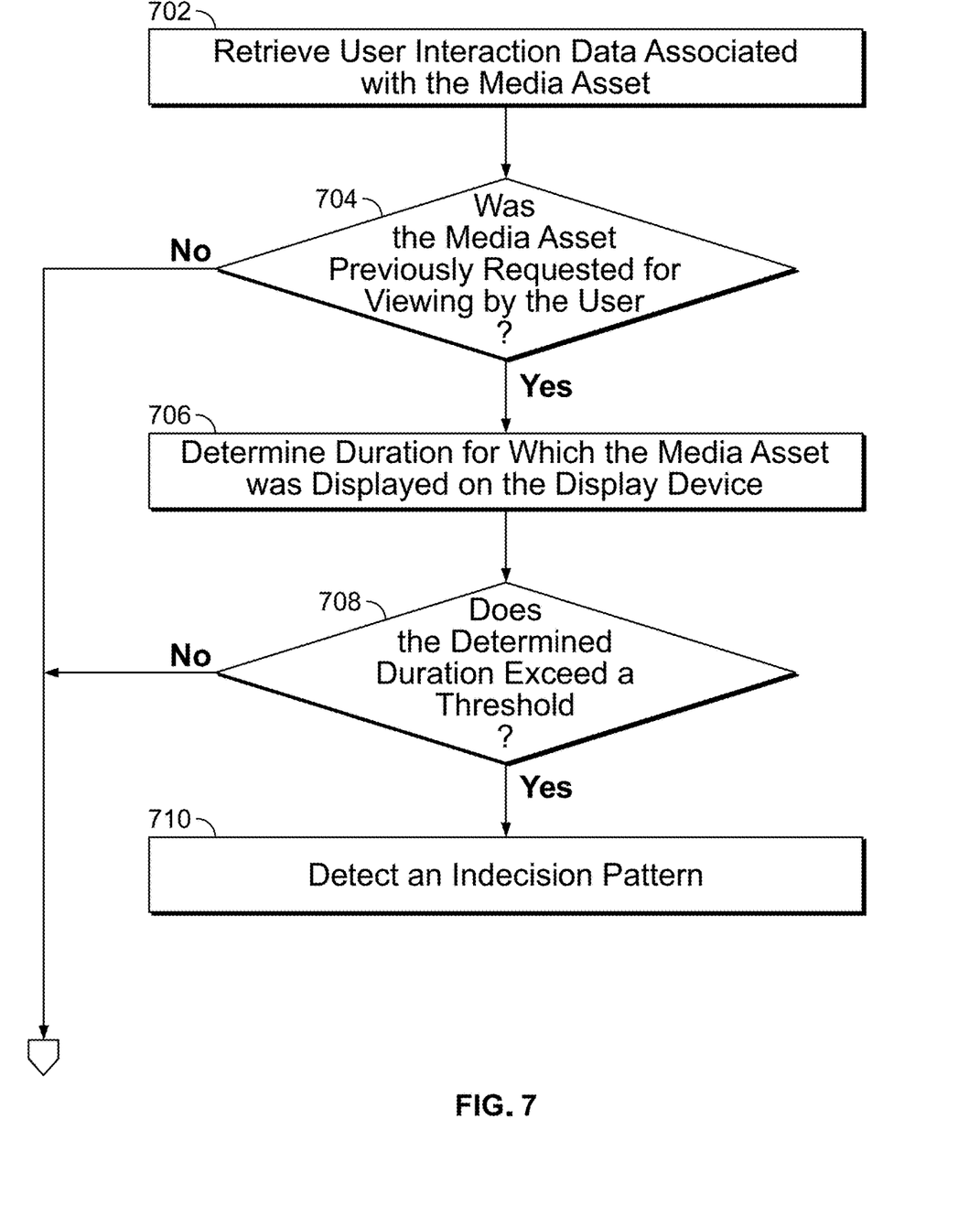
FIG. 7 depicts another illustrative flowchart of a process for detecting an indecision pattern, in accordance with some embodiments of the disclosure.

FIG. 7 depicts another illustrative flowchart of process step 410 (see FIG. 4) for recommending media assets, in accordance with some embodiments of the disclosure. It will be understood that the process depicted in FIG. 7 may be performed in addition to, or as an alternative to, the process depicted in FIG. 6. At 702, control circuitry 204 retrieves user interaction data associated with the media asset. For example, control circuitry 204 of server 101 and/or first user equipment device 102 retrieves all previous instances of the user watching a preview of or requesting ratings information for the television show "Game of Thrones." In some embodiments, the system may also retrieve interactions of the user on social media sites that reference the television show "Game of Thrones" (e.g., user reading any articles/reviews, posts by other users on social media platforms, etc.).

At 704, control circuitry 204 of server 101 and/or first user equipment device 102 determines whether the media asset was previously requested for viewing. For instance, the system determines whether the user has previously started viewing at least one episode of the show "Game of Thrones." If it is determined that the user has never requested the media asset for viewing (NO at 704), the process proceeds to 604 (described above in the context of FIG. 6). If, on the other hand, it is determined the user has previously requested the media asset for viewing (YES at 704), the process proceeds to 706. At 706, control circuitry 204 of server 101 and/or first user equipment device 102 determines a duration for which the media asset was generated for display on a display device (e.g., television screen 104).

At 708, control circuitry 204 of server 101 and/or first user equipment device 102 determines whether the duration for which the media asset was displayed exceeds a threshold. For example, a user may be unsure after watching a first episode of the show "Game of Thrones" whether they want to invest the time to watch the entire series. The system, in response to determining that the user has seen at least one episode (i.e., the threshold duration in this example) but not progressed further, may present the user with recommendations from friends and family. However, to avoid inundating the user's friends and family with requests for recommendations for every media asset portion the user watches, the system may require the user to watch at least a predetermined portion of the media asset before querying the user's friends and family.

If the determined duration exceeds the threshold (YES at 708), the process proceeds to 710 and an indecision pattern is detected. If, on the other hand, the determined duration does not exceed the threshold (NO at 708), the process proceeds to 604 (described above in the context of FIG. 6).

Figure 8:
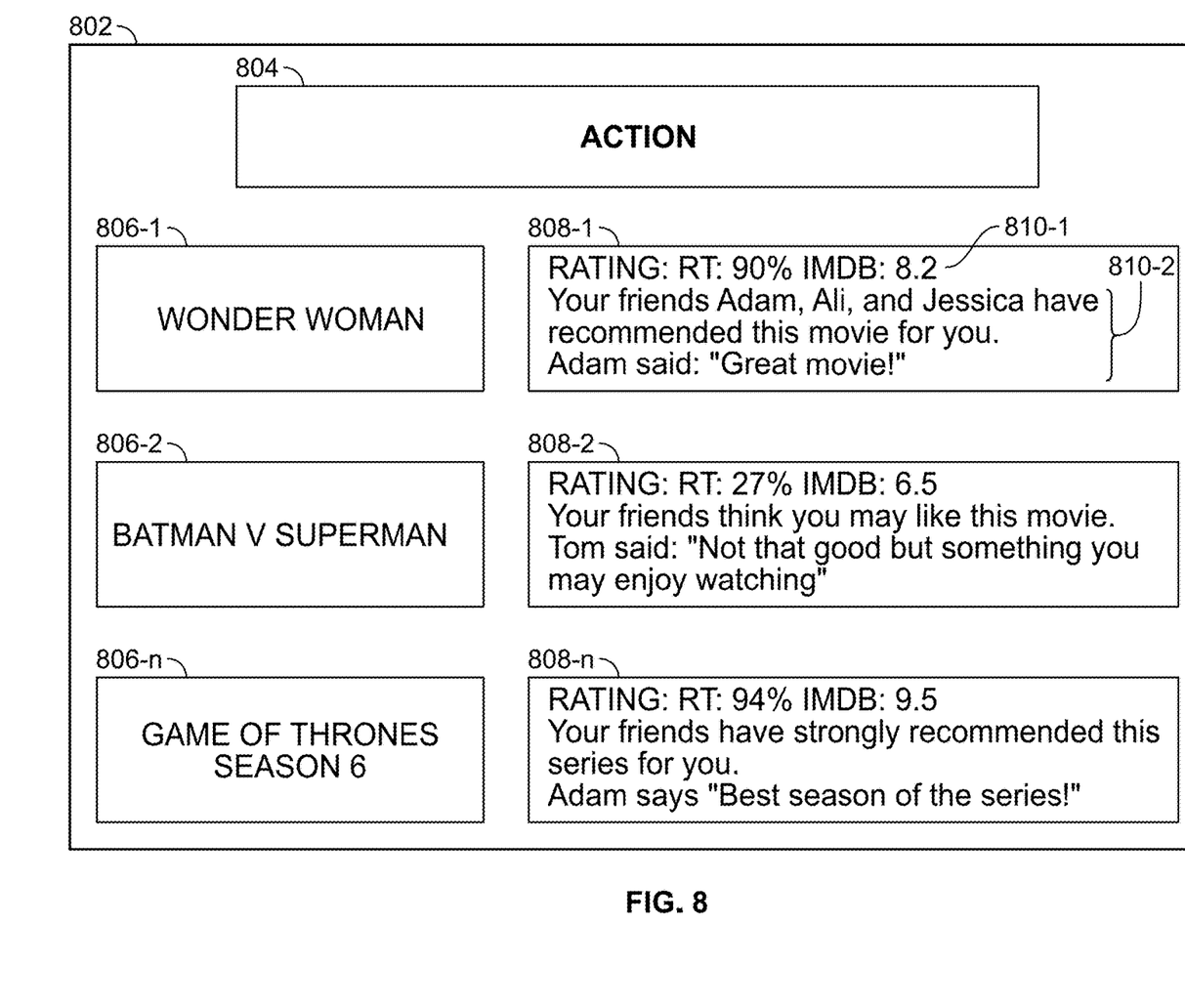
FIG. 8 depicts an illustrative user interface on which media asset recommendations are provided, in accordance with some embodiments of the disclosure.

FIG. 8 depicts an illustrative user interface on which media asset recommendations are provided, in accordance with some embodiments of the disclosure. In particular, a display device associated with the user (e.g., television screen 104) displays an interface 802 listing media assets 806-1, 806-2, . . . , 806-n, collectively 806, along with their respective reviews 808-1, 808-2, . . . , 808-n, collectively 808. In some embodiments, the interface 802 may also organize the media asset listings by categories 804 such as "Action," "Romance," "Comedy," etc. As shown in FIG. 8, the reviews 808 for the media assets 806 include ratings information 810-1 from one or more sources. In addition, the reviews 808 may include personalized recommendations 810-2 from one or more friends and family members of the user with respect to the media assets the user is undecided about watching. For instance, in the example embodiment shown in FIG. 8, reviews 808 may include comments from the user's friend Adam saying "Great movie!" in reference to the movie "Wonder Woman."

As discussed above, media asset recommendation engines often present lists of recommended media assets to a user. However, the user may not find the recommendations credible, especially if the media asset received poor reviews, and therefore may not be inclined to watch the media asset. In contrast, systems consistent with the disclosure here present the user with recommendations made by the user's friends and family members. Therefore, the user is less likely to miss out on content that they would likely enjoy but are undecided about watching based on available information. For example, as illustrated in FIG. 8, the movie "Batman v Superman" may be recommended to a user. In conventional systems, the user may be conflicted about watching the movie despite the recommendation because of the available reviews. In contrast, the present disclosure provides media asset recommendations to the user from the user's friends and family members. Thus, the user is more likely to find the recommendation credible and watch the recommended media asset.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods. For example, processes depicted in FIGS. 4-7 can be performed on any of the devices shown in FIGS. 1-3. Additionally, any of the steps in processes depicted in FIGS. 4-7 can be performed in any order, can be omitted, and/or can be combined with any of the steps from any other process.

While some portions of this disclosure may refer to "convention," any such reference is merely for the purpose of providing context to the invention(s) of the instant disclosure, and does not form any admission as to what constitutes the state of the art.

What is claimed is:

1. A method for providing media asset recommendations to a user, the method comprising:
   detecting an input to a user interface requesting content associated with a media asset, wherein the input is detected while the media asset is not displayed on a display device associated with the user interface;
   in response to the detecting, retrieving a user interaction history comprising interaction data associated with the media asset;
   detecting, based on the user interaction history, an indecision pattern;
   in response to detecting the indecision pattern:
      selecting recipients of electronic queries based on a match between the media asset and media profile information of the recipients;
      transmitting the electronic queries to the recipients, each electronic query requesting a recommendation for the media asset;
      receiving responses to the electronic queries from the recipients; and
      generating for display a recommendation for the media asset based on the received responses.

2. The method of claim 1, wherein:
   the input to the user interface requesting content associated with a media asset is a verbal request;
   the method further comprises:
      extracting, via control circuitry, keywords from the received verbal request; and
      comparing, via the control circuitry, the extracted keywords against a database storing a list of media assets previously referenced to by the user to identify a match; and
   wherein:
      the user interaction history comprising interaction data associated with the media asset is retrieved responsive to identifying a match.

3. The method of claim 1, wherein:
   the input to the user interface requesting content associated with a media asset is a request for ratings information associated with the media asset;
   the method further comprises:
      comparing, via the control circuitry, the media asset associated with the requested ratings information against a database storing a list of media assets previously referenced to by the user to identify a match; and
   wherein:
      the user interaction history comprising interaction data associated with the media asset is retrieved responsive to identifying a match.

4. The method of claim 1, wherein:
   detecting, from the user interaction history, the indecision pattern comprises:
      determining a number of times the user has previously requested content associated with the media asset without displaying the media asset; and
      determining whether the number of times the user has previously requested content associated with the media asset without displaying the media asset exceeds a threshold; and
   wherein:
      the indecision pattern is detected in response to determining that number of times the user has previously requested content associated with the media asset without displaying the media asset exceeds the threshold.

5. The method of claim 1, wherein:
  detecting, from the user interaction history, the indecision pattern comprises:
    determining, from the user interaction history, whether the media asset was previously requested for viewing by the user;
    in response to determining that the media asset was previously requested for viewing by the user, determining whether the media asset was displayed on the display device associated with the user interface;
    in response to determining that the media asset was displayed on a display device associated with the user interface, determining a duration of time for which the media asset was displayed on the display device; and
    determining whether the duration for which media asset was displayed exceeds a threshold period of time; and
  wherein:
    the indecision pattern is detected in response to determining that the duration for which media asset was displayed does not exceed the threshold period of time.

6. The method of claim 5, wherein:
  the media asset comprises a series of episodes; and
  determining, from the user interaction history, whether the media asset was previously requested for viewing by the user comprises:
    determining, from the user interaction history, whether at least one episode of the series of episodes was previously requested for viewing by the user.

7. The method of claim 1, wherein selecting recipients of electronic queries based on a match between the media asset and media profile information of the recipients comprises:
  retrieving, via the control circuitry, media asset viewing histories of a plurality of people associated with the user;
  determining, from the retrieved media asset viewing histories, whether the media asset was previously generated for display on a display associated with one or more of the plurality of people; and
  in response to determining that the media asset was previously generated for display on the display associated with one or more of the plurality of people, selecting the one or more people to be recipients of the electronic queries.

8. The method of claim 1, wherein transmitting the electronic queries to the recipients comprises:
  identifying, by the control circuitry, an electronic device associated with each of the recipients;
  selecting, by the control circuitry, a delivery method from a plurality of delivery methods for transmitting the electronic queries to the identified electronic devices; and
  transmitting, by the control circuitry, the electronic query to the recipients via the selected delivery method.

9. The method of claim 8, wherein the delivery method is selected based at least in part on the capabilities of the identified electronic device.

10. The method of claim 1, wherein generating for display a recommendation for the media asset based on the received responses comprises:
  assigning a respective weight to the responses provided by each of the recipients based on a match between a media profile information of the user and the media profile information of the respective recipient;
  generating a summary of the received responses based on the assigned weights; and
  generating for display the summary as the recommendation for the media asset based on the received responses.

11. A system for providing media asset recommendations to a user, the system comprising:
  control circuitry configured to:
    detect an input to a user interface requesting content associated with a media asset, wherein the input is detected while the media asset is not displayed on a display device associated with the user interface;
    in response to the detecting, retrieve a user interaction history comprising interaction data associated with the media asset;
    detect, from the user interaction history, an indecision pattern;
    in response to detecting the indecision pattern:
      select recipients of electronic queries based on a match between the media asset and media profile information of the recipients;
      transmit the electronic queries to the recipients, each electronic query requesting a recommendation for the media asset;
      receive responses to the electronic queries from the recipients; and
      generate for display a recommendation for the media asset based on the received responses.

12. The system of claim 11, wherein:
  the input to the user interface requesting content associated with a media asset is a verbal request;
  the control circuitry is further configured to:
    extract keywords from the received verbal request; and
    compare the extracted keywords against a database storing a list of media assets previously referenced to by the user to identify a match; and
    retrieve the user interaction history comprising interaction data associated with the media asset responsive to identifying a match.

13. The system of claim 11, wherein:
  the input to the user interface requesting content associated with a media asset is a request for ratings information associated with the media asset;
  the control circuitry is further configured to:
    compare the media asset associated with the requested ratings information against a database storing a list of media assets previously referenced to by the user to identify a match; and
    retrieve the user interaction history comprising interaction data associated with the media asset responsive to identifying a match.

14. The system of claim 11, wherein the control circuitry, when detecting, from the user interaction history, the indecision pattern, is configured to:
  determine a number of times the user has previously requested content associated with the media asset without displaying the media asset;
  determine whether the number of times the user has previously requested content associated with the media asset without displaying the media asset exceeds a threshold; and
  detect the indecision pattern in response to determining that number of times the user has previously requested content associated with the media asset without displaying the media asset exceeds the threshold.

15. The system of claim 11, wherein the control circuitry, when detecting, from the user interaction history, the indecision pattern, is configured to:
- determine, from the user interaction history, whether the media asset was previously requested for viewing by the user;
- in response to determining that the media asset was previously requested for viewing by the user, determine whether the media asset was displayed on the display device associated with the user interface;
- in response to determining that the media asset was displayed on a display device associated with the user interface, determine a duration of time for which the media asset was displayed on the display device;
- determine whether the duration for which media asset was displayed exceeds a threshold period of time; and
- detect the indecision pattern in response to determining that the duration for which media asset was displayed does not exceed the threshold period of time.

16. The system of claim 15, wherein:
the media asset comprises a series of episodes; and
the control circuitry, when determining, from the user interaction history, whether the media asset was previously requested for viewing by the user, is configured to:
- determine, from the user interaction history, whether at least one episode of the series of episodes was previously requested for viewing by the user.

17. The system of claim 11, wherein the control circuitry, when selecting recipients of electronic queries based on a match between the media asset and media profile information of the recipients, is configured to:
- retrieve media asset viewing histories of a plurality of people associated with the user;
- determine, from the retrieved media asset viewing histories, whether the media asset was previously generated for display on a display associated with one or more of the plurality of people; and
- in response to determining that the media asset was previously generated for display on the display associated with one or more of the plurality of people, select the one or more people to be recipients of the electronic queries.

18. The system of claim 11, wherein the control circuitry, when transmitting the electronic queries to the recipients, is configured to:
- identify an electronic device associated with each of the recipients;
- select a delivery method from a plurality of delivery methods for transmitting the electronic queries to the identified electronic devices; and
- transmit the electronic query to the recipients via the selected delivery method.

19. The system of claim 18, wherein the control circuitry is configured to select the delivery method based at least in part on the capabilities of the identified electronic device.

20. The system of claim 11, wherein the control circuitry, when generating for display a recommendation for the media asset based on the received responses, is configured to:
- assign a respective weight to the responses provided by each of the recipients based on a match between a media profile information of the user and the media profile information of the respective recipient;
- generate a summary of the received responses based on the assigned weights; and
- generate for display the summary as the recommendation for the media asset based on the received responses.

* * * * *